Oct. 6, 1953 — W. F. FUHRMAN — 2,654,505
AUTOMATIC VENDING MACHINE
Original Filed Sept. 5, 1947 — 4 Sheets-Sheet 2

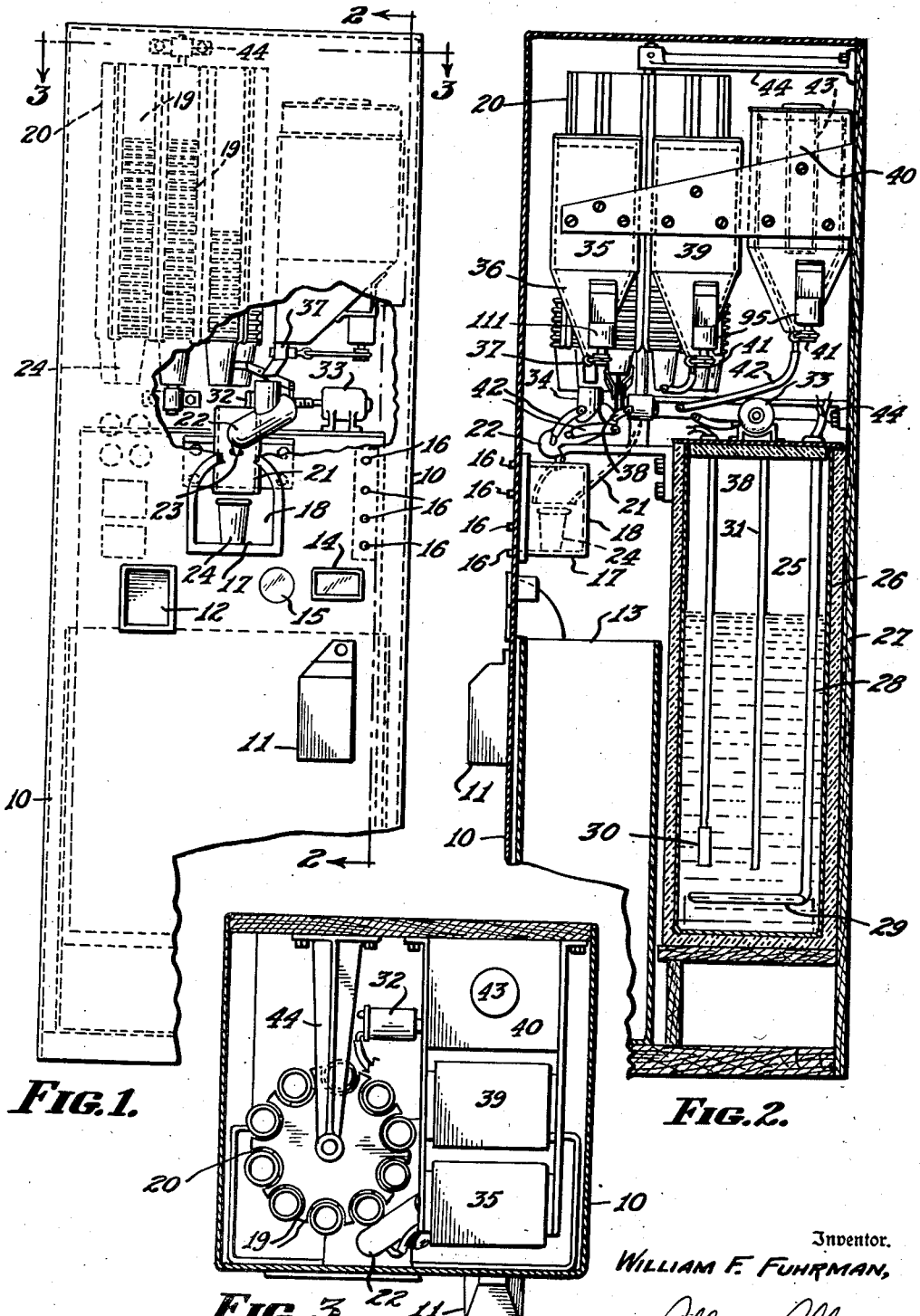

Inventor.
WILLIAM F. FUHRMAN,
By
Allen + Allen
Attorneys.

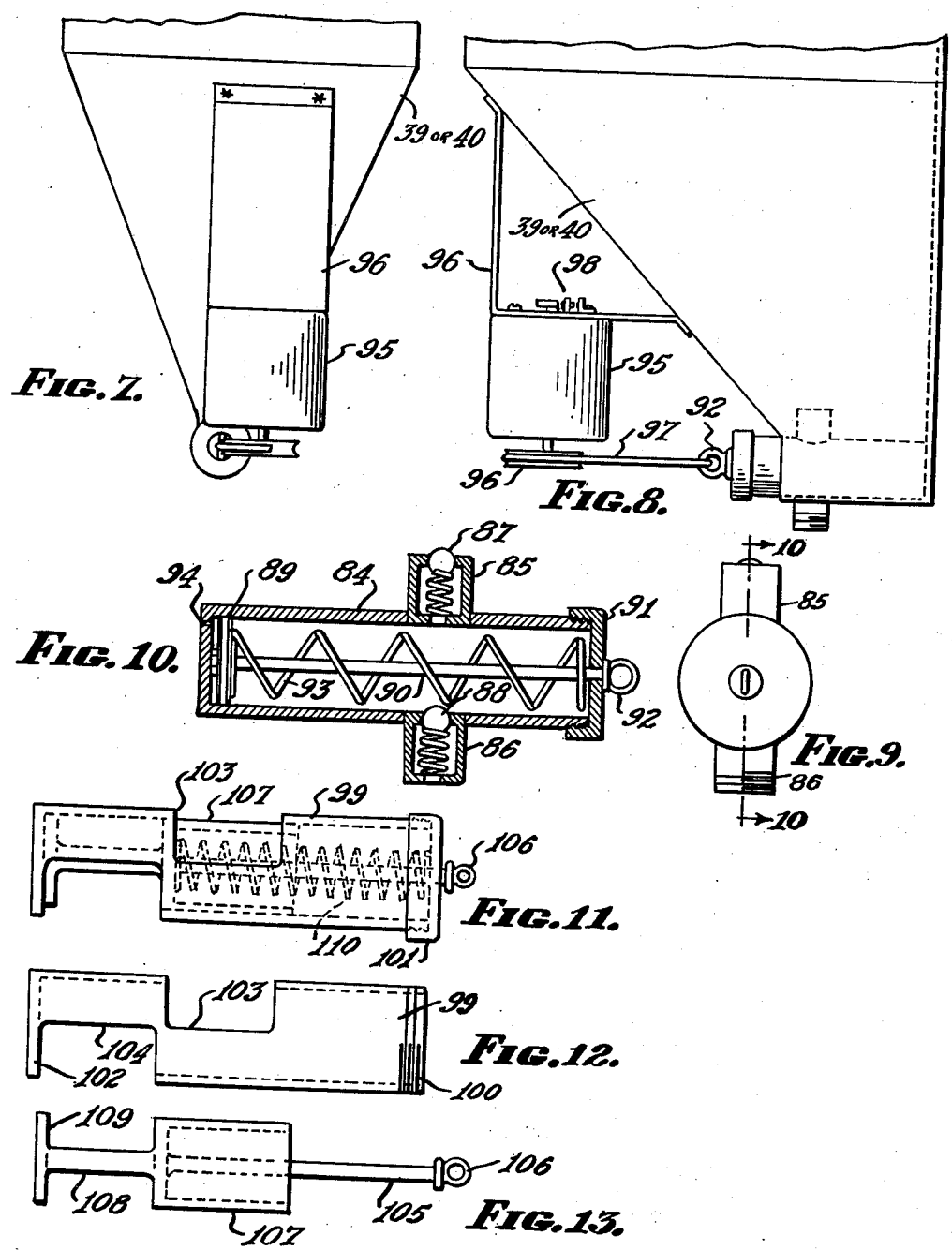

Patented Oct. 6, 1953

2,654,505

UNITED STATES PATENT OFFICE 2,654,505

AUTOMATIC VENDING MACHINE

William F. Fuhrman, Los Angeles, Calif., assignor of one-half to Elmer O. Gerth, Richmond, Ind.

Original application September 5, 1947, Serial No. 772,361, now Patent No. 2,566,127, dated August 28, 1951. Divided and this application August 16, 1950, Serial No. 179,823

5 Claims. (Cl. 222—2)

This invention relates to an automatic vending machine for beverages, and is a division of my copending application, Serial No. 772,361, filed September 5, 1947, now Patent No. 2,566,127, dated August 28, 1951. Two other applications filed of even date herewith are also divisions of said application above identified. While it is capable of serving as a dispenser for a variety of beverages, hot or cold, in which a number of ingredients are mixed together, I have shown and described it specifically as a machine for vending hot coffee. In connection with the description, I have used the words "coffee," "water," "cream," and "sugar," but it is to be understood that when I speak of "coffee," I intend to include any ingredient in finely divided solid form, and that when I speak of "cream" and "syrup," I mean any ingredients in liquid form and, of course, in connection with the word "water," I mean any other potable liquid.

There have been numerous beverage dispensers on the market for dispensing all kinds of beverages. Such dispensers are conveniently located in places, such as railroad stations, bus terminals and the like, and such dispensers have met with great public acceptance. To my knowledge, however, there has never been available a vending machine for vending hot coffee in cups.

It is therefore an object of my invention to provide a vending machine for dispensing hot coffee in cups. It is a further object of my invention to provide controls accessible to the customer and settable by him whereby a customer may obtain his coffee black, with sugar only, with cream only, or with cream and sugar.

It is another object of my invention to provide a supply of water, together with means for maintaining the same at a suitably high temperature, and to provide means operative in connection with the dropping of a coin into a slot for metering out a predetermined quantity of hot water.

It is another object of my invention to provide a supply of soluble coffee in finely divided solid form, and to provide means automatically operative to meter out a predetermined quantity of said coffee.

Still another object of my invention has to do with the provision of a supply of cream or milk and a supply of sweetening material, preferably in the form of syrup, with normally inoperative means for metering predetermined quantities thereof into said mixing chamber. In connection with the last named object, an ancillary object is to provide control means settable by a customer to render either or both of said last mentioned means operative when the rest of the machine is operating.

Ancillary to the objects above set forth, my objects include the provision of certain mechanisms for carrying out the various functions described in an efficient and simple manner.

These and other objects of my invention, which will be pointed out in more detail hereinafter or which will be apparent to one skilled in the art upon reading these specifications, I accomplish by that certain construction and arrangement of parts, of which I shall now describe an exemplary embodiment. Reference is made to the drawings forming a part hereof and in which:

Figure 1 is a front elevational view of the machine with a portion of the casing broken away in order to show certain of the parts within the casing.

Figure 2 is a vertical cross-sectional view taken on the line 2—2 of Figure 1.

Figure 3 is a horizontal cross-sectional view taken on the line 3—3 of Figure 1.

Figure 7 is a front elevational view of one of the secondary ingredient supplies and mechanism for metering the same.

Figure 8 is an elevational view as seen from the right of Figure 7.

Figure 9 is an end elevation of the metering device on an enlarged scale.

Figure 10 is a cross-sectional view taken on the line 10—10 of iFgure 9.

Figure 11 is an elevational view of the metering device used in connection with a solid ingredient.

Figure 12 is an elevational view of the cylinder portion of Figure 11.

Figure 13 is a side elevation of the piston portion of Figure 11.

Figure 4:
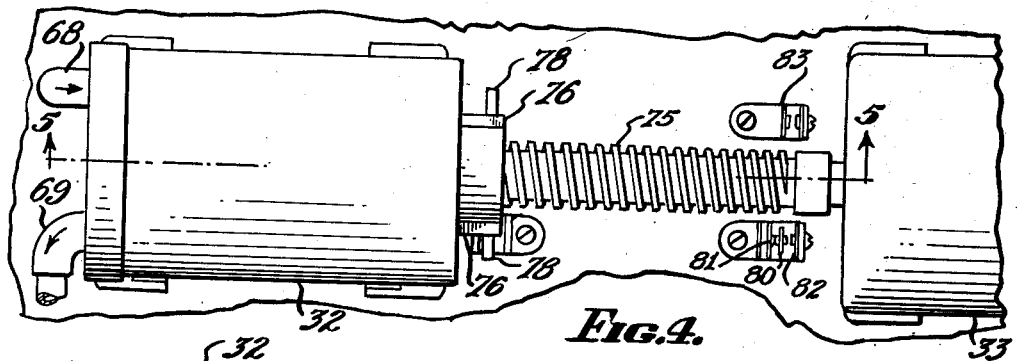
Figure 4 is a plan view of the pump and motor and the connections therebetween for metering water from the water supply.

Referring first to Figures 1 to 3 inclusive, I provide a casing for the machine indicated generally at 10. On the front face thereof is secured a coin slot and receptacle 11 of any conventional form. An opening 12 in the front face of the casing communicates with a bin 13 within the casing for disposal of used cups. A window 14 may be provided for use of service personnel, as well as an indicator 15 for indicating the temperature of the water in the water supply. A series of control buttons 16 accessible to the customer is provided. These buttons may be suitably labeled to indicate "black," "cream only," "sugar only," and "cream and sugar." Substantially centrally of the front of the casing, I provide a filling platform 17 in a suitable recess 18 to which a cup to be filled is delivered from a supply of cups for filling from a mixing chamber. A supply of cups is carried in a series of magazines 19 mounted in a carrier, indicated generally at 20, and individual cups are delivered from a magazine 19 through a chute 21 to the filling platform 17, as described in more detail and claimed in my said copending application, Serial No. 772,361, now Patent No. 2,566,127, dated August 28, 1951. The mixing chamber is indicated generally at 22, and it will be noted that it has a discharge member 23 extending slightly through an aperture in the cup chute 21 so that the member 23 is positioned to discharge the contents of the mixing chamber into a cup 24 resting on the filling platform 17, as clearly shown in Figures 1 and 2.

By way of further general description, a hot water tank is indicated at 25 which is preferably lined with stainless steel or similar material, as at 26, and is provided with insulation 27. A heating element 28 extends down through the tank to a point near the bottom where it is disposed in coils 29. A thermocouple element 30 may be connected by suitable electrical connections to the dial 15. A withdrawal tube 31 extends to near the bottom of the tank and is connected to a metering pump 32 driven by a motor 33, as will be described in more detail hereinafter.

The mixing chamber 22 is provided with a hopper 34 disposed directly beneath a coffee supply bin 35. The bin 35 preferably has a tapered lower portion 36 terminating in a metering device indicated generally at 37, which will be described in more detail hereinafter. At this point it will suffice to say that the metering device 37 meters out a predetermined quantity of finely divided solid soluble coffee into the hopper 34 of the mixing chamber 22. The pump 32 is connected by means of tubing 38 to the mixing chamber 22.

At 39 is indicated a supply for a secondary ingredient, in this case specifically a syrup for sweetening purposes, and at 40 is shown a supply for another secondary ingredient, in this case specifically, cream. Each of these supplies is provided with identical metering means 41, and the metered quantities passing through the metering devices 41 are led into the mixing chamber by means of tubing 42. These parts have been given identical reference numerals because they are in all respects identical. The cream supply receptacle 40 is provided with a cylindrical insertable member 43 which may be filled with solidified carbon dioxide for cooling purposes.

I shall now describe various individual portions of the machine and afterwards describe the general operation.

Water supply and delivery

Figure 5:
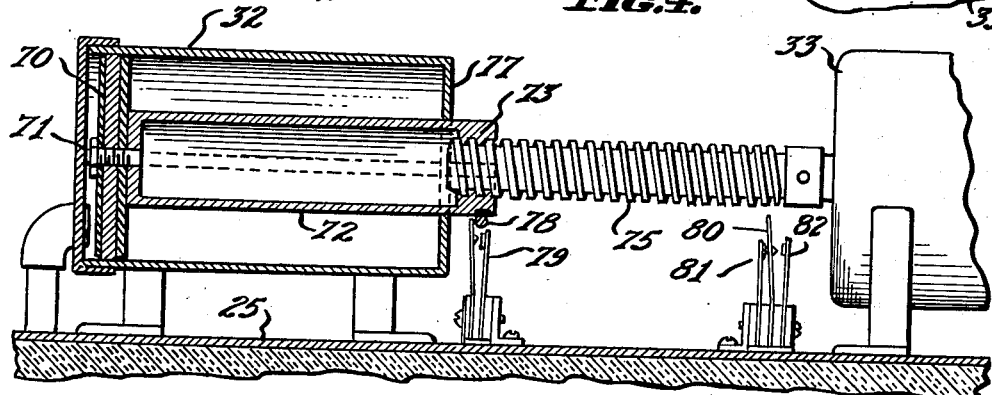
Figure 5 is a cross-sectional view of the same taken on the line 5—5 of Figure 4.
Figure 6:
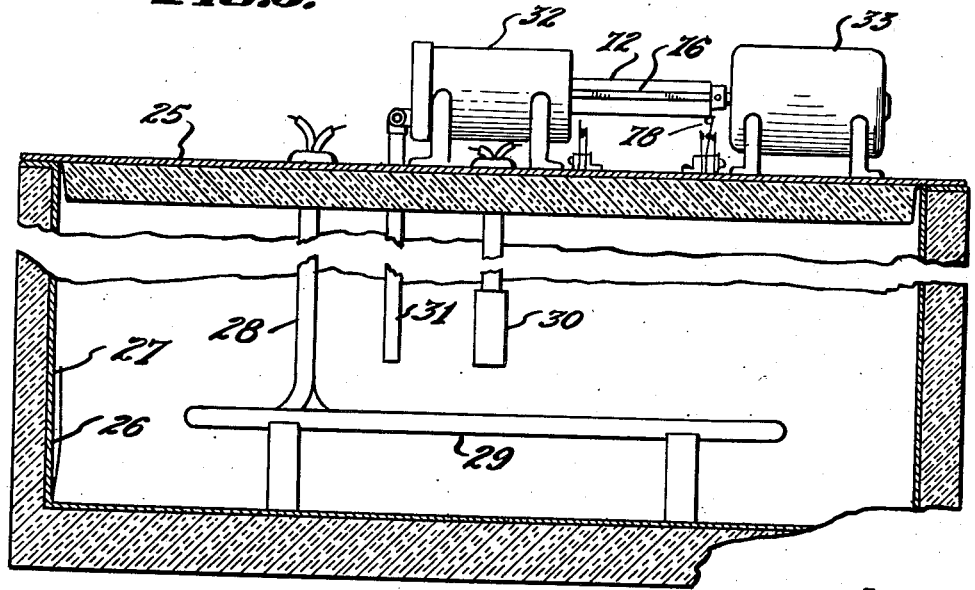
Figure 6 is a fragmentary cross-sectional view through the hot water tank showing the pump and motor positioned thereon.

Referring now to Figures 4, 5 and 6, the pump 32 and motor 33 are shown mounted on top of the water tank 25 on suitable brackets. The water pump 32 is provided with an intake fitting 68 and a delivery fitting 69, each of which is provided with a suitable check valve. Within the cylinder 32, I provide a piston 70 so that when the piston 70 is moved to the right of Figure 5, a quantity of hot water is drawn from the tank 25 into the cylinder 32, and upon the return stroke of the piston 70 that quantity of hot water is delivered through the fitting 68. Secured to the piston 70, by any suitable means indicated at 71, is a hollow piston rod 72 terminating in a nut 73. The shaft 74 of the motor 33 has secured to it a screw 75 which engages the nut 73 so that when the motor turns, the screw likewise turns and draws up the nut 73, thus moving the piston 70 to the right. The nut 73 is prevented from turning by suitable keys 76 engaging slots in the cylinder end 77. Secured to the nut portion 73 is a pin 78 which actuates a number of switches. In the normal "at rest" position of the apparatus, the member 78 holds open a normally closed switch 79, so that as soon as the motor 33 starts to move the piston 70, the switch 79 will be closed. The pin 78 is also arranged to abut a switch 80 at the end of the piston stroke to throw it from engagement with the contact 81 to engagement with the contact 82. The pin 78 also engages a switch 83 at the end of the piston stroke, which switch 83 is normally open and is closed normally by the pin 78.

Liquid ingredient metering mechanism

Referring more particularly to Figures 7 to 10 inclusive, I shall describe now the metering device for metering a predetermined quantity of a liquid ingredient and it should be understood that this device is identical for the syrup supply and cream supply, and will therefore only be described once. The bin shown in Figures 7 and 8 may be the container either for the syrup or the cream indicated at 39 and 40 in Figure 2. Secured to the bottom of said bin is a metering device best seen in Figure 10. It comprises generally a cylinder 84 having an upwardly extending fitting 85 and a downwardly extending fitting 86, each supplied with a suitable one-way valve to permit downward flow and to prevent upward flow, and indicated generally at 87 and 88. Within the cylinder 84 is a piston 89 having a rod 90 passing out through the end member 91 of the cylinder and terminating in an eye 92. A spring 93 urges the piston 89 toward the left of Figure 10. A suitable breather aperture is provided at 94.

Assuming the interior of the cylinder 84 to be filled with a liquid ingredient, a movement of the piston 89 to the right of Figure 10 will express a portion of said liquid ingredient through the valve 88 and fitting 86. Upon release of the pull on the piston 89, it will return to the position shown under the influence of the spring 93 and in so doing will draw the same amount of liquid into the cylinder 84 through the valve 87 and fitting 85.

The motor 95 is mounted on a bracket 96 secured to the container 39 or 40 and carries on its shaft a pulley 96 to which is secured a flexible element 97 which is secured to the eye 92. The operation of this motor is such that it rotates approximately one-half turn whereupon an element on the motor shaft abuts a switch 98 to stop the motor, whereupon the spring 93 returns the parts to their initial position.

Solid ingredient metering device

In Figures 11 to 13 inclusive I have shown a device for metering a solid ingredient in finely divided form and indicated generally at 37 in Figure 2. As seen in Figure 12, the metering device comprises a cylindrical element 99 threaded at one end, as at 100, for a cap 101 and closed at the opposite end by a wall 102. A portion of cylinder 99 is cut away on the upper side thereof as indicated at 103, and a similar portion is cut away on the lower side, as indicated at 104. The cut-away portions 103 and 104 are in non-overlapping relation.

A piston, as shown in Figure 13, is arranged to operate within the cylinder 99 with its rod 105 terminating in the eye 106, passing through an aperture in the cap 101. A main piston 107 is provided which is of a length to close completely the opening 103 and extending from the piston 107 by means of a rod 108 is a supplementary piston 109 which is relatively thin. The piston 107 is hollow to provide a seat for a spring 110.

With the parts assembled as shown in Figure 11, the piston 107 completely covers the opening 103 which is in communication with the coffee supply. When the piston is moved to the right, as by a pull on the eye 106, the piston 109 comes to a position where its right face is substantially aligned with the apertures 103 and its left face is substantially aligned with the aperture 104. An end of the piston 107 is substantially aligned with the other end of the aperture 103. In this position coffee can enter the cylinder 99 in the pocket between the pistons 107 and 109 so that when the pull on the piston is released and the spring 110 returns the parts to the position of Figure 11, the metered amount of coffee is moved to the left and drops out through the aperture 104.

The piston is operated from a motor 111 which is identical with the motors 95 and operates in exactly the same manner.

General operation

Figure 14:
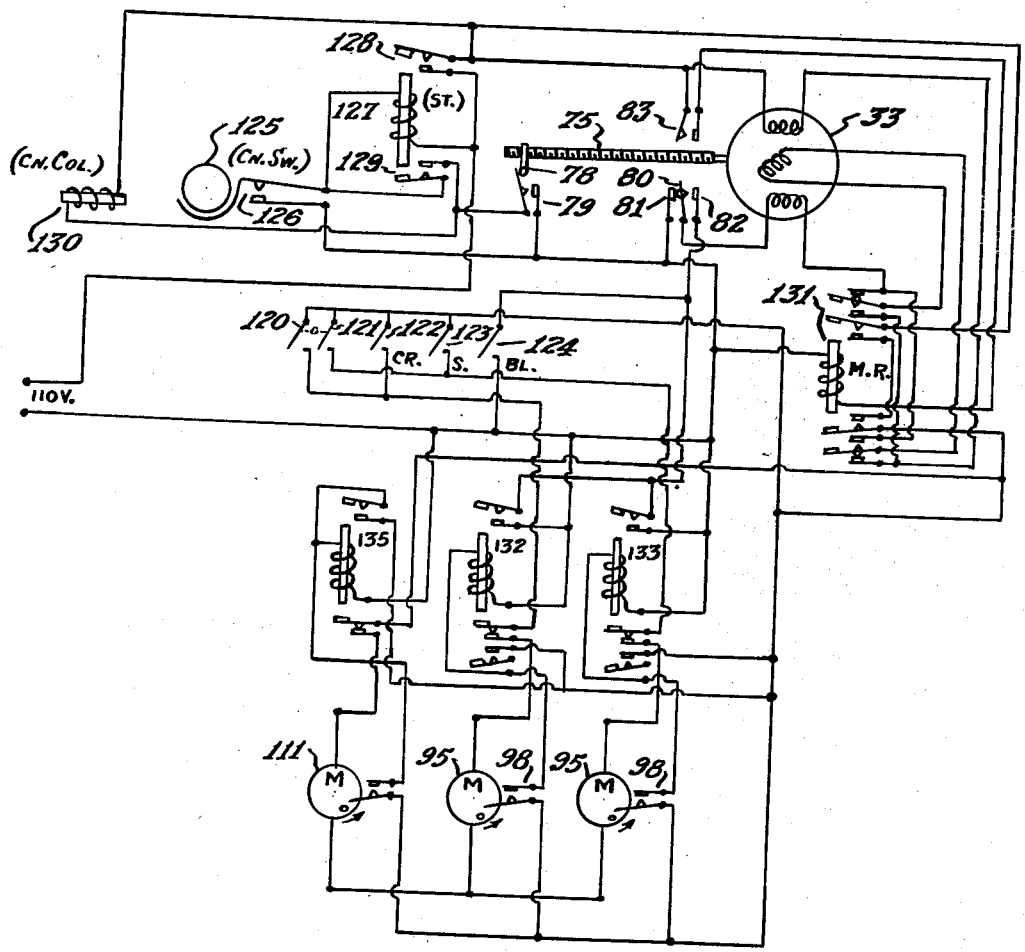
Figure 14 is a schematic wiring diagram of the machine.

Referring now more particularly to Figure 14, I shall describe the general over-all operation of the vending machine. When a coin 125 is deposited in the slot, it actuates a coin switch 126 to close the same. The closing of this switch energizes the starting relay which, in turn, closes the switches 128 and 129 which closes the line voltage to the remainder of the circuit and starts pump motor 33 on its first half-cycle of operation.

As soon as the motor 33 starts to turn, the pin 78 clears the switch 79 permitting it to close. This completes a circuit locking the starting relay and operating the coin collect relay 130, which permits the coin 125 to drop into the coin box (not shown). As the motor 33 continues to rotate and continues to move the piston toward the right, drawing hot water from the tank 25 into the cylinder 32, the pin 78 moves to the right until it contacts the switches 80 and 83. At this point it closes the switch 83 and throws the switch 80 out of contact with the contact 81 and into contact with the contact 82. Operation of the switches 80 and 83 operates the motor reversing relay 131 and transfers the field winding of the motor 33 from the line to the contacts of the cream and syrup relays 132 and 133 and the black selection switch 124. The motor reversing relay 131 locks and the pump motor 33 reverses its direction of operation and begins the pumping or delivery stroke. The operation of the motor reversing relay 131 closes the line to the selection switches and to the coffee motor 111. This motor operates and in turn operates the coffee relay 135 which locks. At this stage the cream and syrup motors 95 also operate if their respective switches 122 and 123 are closed. The pump motor 33 continues to drive the piston on its pumping stroke until the contacts 79 are opened by the pin 78 at which time the starting relay 127 is de-energized, thereby releasing or de-energizing all other relays.

From the foregoing description, it will be seen that I have provided an automatic vending machine which is coin operated to deliver a cup of hot coffee to a customer, either black, or with cream only, or with sugar only, or with cream and sugar depending upon the setting which the customer has made. As pointed out above, the machine, with minor modifications, is adapted for use for delivery of other beverages than coffee in cups, and as a matter of fact, it can deliver, with minor modifications which will be within the range of one skilled in the art, any mixed beverage including solid or liquid ingredients. For these reasons I do not intend to limit myself except as pointed out in the claims which follow.

Having now fully described my invention, what I claim as new and desire to secure by Letters Patent is:

1. In a device of the character described, a supply of free flowing liquid and means for withdrawing a predetermined amount thereof and delivering it for use, comprising a reciprocating piston pump having a displacement substantially equal to said predetermined amount and having intake and delivery ports provided with check valves, a motor for actuating said pump and having a screw secured to its shaft, said piston being secured to a nut in operative relation with said screw whereby rotation of said motor in a first direction moves said piston to draw liquid from said supply into said pump, coin controlled means for starting said motor, a reversing switch for said motor positioned to be actuated by said nut at the end of the intake stroke of said piston to cause said motor to reverse its direction whereby said pump delivers said predetermined amount of liquid, and a normally closed switch positioned to be opened by said nut at the end of the delivery stroke to stop said motor.

2. A device according to claim 1 in which said coin controlled means energizes a relay to start said motor, said normally open switch being closed as soon as the pump begins to operate, thus locking said relay until the completion of the intake and delivery cycle.

3. In a device of the character described, a supply of an ingredient in liquid form, and means for delivering a metered quantity thereof from said supply, comprising a metering chamber and a piston in said chamber having a rod, spring means for normally holding said piston in one position, and means for moving said piston against the effort of said spring means to another position, said last named means comprising a motor having a pulley, a flexible element secured to said pulley and to said piston rod, a normally open switch adjacent said pulley and means associated with said pulley for closing said switch after a predetermined amount of rotation, a relay in a circuit including said normally open switch, said motor being in a circuit including a normally closed switch positioned to be opened by said relay, and coin controlled means for starting said motor, whereby after a predetermined amount of rotation said normally open switch is closed to energize said relay and open said normally closed motor switch.

4. In a device of the character described, a supply of an ingredient in finely divided solid form, and means for delivering a metered quantity thereof from said supply, comprising a metering cylinder and a piston having a rod, spring means for normally holding said piston in one position, and means for moving said piston against the effort of said spring means to another position, said last named means comprising a motor having a pulley, a flexible element secured to said pulley and to said piston rod, a normally open switch adjacent said pulley and means associated with said pulley for closing said switch after a predetermined amount of rotation, a relay in a circuit including said normally open switch, said motor being in a circuit including a normally closed switch positioned to be opened by said relay, and coin controlled means for starting said motor, whereby after a predetermined amount of rotation said normally open switch is closed to energize said relay and open said normally closed motor switch.

5. In a device of the character described, a supply of an ingredient, and means for metering a quantity thereof from said supply, comprising a metering chamber, a member movable in said chamber in one direction to cause an amount of said ingredient to enter said chamber and movable in another direction to cause said amount to be delivered from said chamber, spring means continually to urge said member in one direction, and coin controlled means to cause said member to move in the other direction, said coin controlled means including a motor having a pulley, a flexible element secured to said pulley and to said member, a normally open switch adjacent said pulley and means associated with said pulley for closing said switch after a predetermined amount of rotation, a relay in a circuit including said normally open switch, said motor being in a circuit including a normally closed motor switch positioned to be opened by said relay and said coin controlled means for starting said motor, whereby after a predetermined amount of rotation said normally open switch is closed to energize said relay and open said normally closed motor switch.

WILLIAM F. FUHRMAN.

References Cited in the file of this patent

UNITED STATES PATENTS

| Number | Name | Date |
|---|---|---|
| 697,510 | Mattox | Apr. 15, 1902 |
| 1,118,381 | Thomas | Nov. 24, 1914 |
| 1,558,244 | Davis | Oct. 20, 1925 |
| 1,608,610 | Meyer | Nov. 30, 1926 |
| 1,846,135 | Mickelson | Feb. 23, 1932 |
| 1,879,876 | Krause | Sept. 27, 1932 |